(No Model.)

R. WILSON.
ROLLER BEARING.

No. 531,757. Patented Jan. 1, 1895.

Witnesses:
Ralph Wormelle
Gerald Griffin

Inventor:
Robert Wilson
By Patrick Farrell
Atty

UNITED STATES PATENT OFFICE.

ROBERT WILSON, OF ST. LOUIS, MISSOURI.

ROLLER-BEARING.

SPECIFICATION forming part of Letters Patent No. 531,757, dated January 1, 1895.

Application filed April 9, 1894. Serial No. 506,887. (No model.)

*To all whom it may concern:*

Be it known that I, ROBERT WILSON, a citizen of the United States of America, residing at St. Louis, in the State of Missouri, have invented certain new and useful Improvements in Roller-Bearings, of which the following is a specification, reference being had therein to the accompanying drawings.

My invention relates to an improvement in bearings for carriage, wagon and other wheels, in which the wheel revolves around the axle, the axle being non-revolving, and the object of my improvement is the production of a simple and inexpensive means for reducing the friction between the wheel and the axle, thereby lessening the power required to revolve said wheel, also reducing the wear of said wheel or boxing and the axle.

The invention comprises the details of construction, combination and arrangement of parts, substantially as hereinafter fully set forth and particularly pointed out in the claims.

Figure 1:
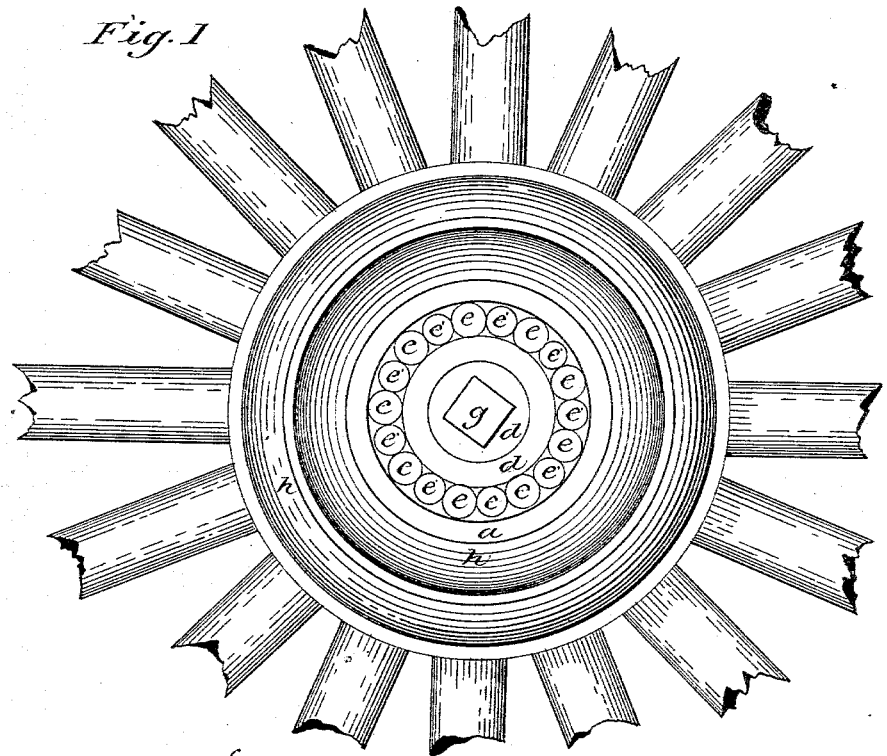
Figure 2:
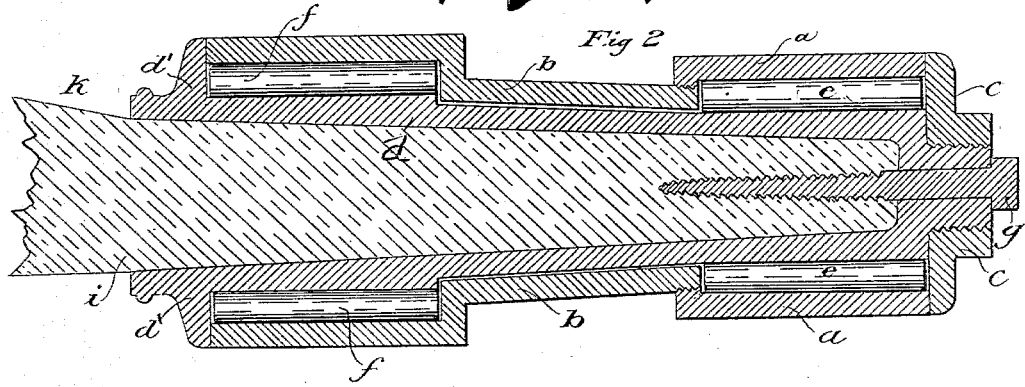
Figure 3:
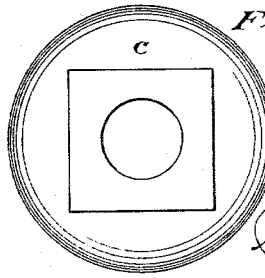

In the accompanying drawings, Figure 1, is an elevation of a wagon wheel with the outer portion broken away and the nut which holds the wheel in place removed. Fig. 2, is a longitudinal section of the boxing and axle cut through the center of said axle. Fig. 3 is an elevation of the nut or cap which holds the wheel in place upon the axle.

The tubular or cylindrical part $a$ having a thread cut upon a portion of its inner surface and the tubular or cylindrical part $b$ having a thread cut upon a portion of its outer surface constitute the boxing.

$h$ is the hub, commonly made of wood, which is bored to fit the boxing $a\ b$. Parts $a$ and $b$ are put into the hub from opposite sides and united by means of the threads heretofore mentioned, thus forming a boxing the middle portion of which is of smaller diameter than the two end portions, said middle portion being of a diameter measuring on the inside just sufficiently large to admit of the axle revolving within it without touching said axle. A boxing constructed in this manner can be inserted into the hub without cutting away the latter at its center, thereby not impairing the strength of the hub.

$k$ is the axle commonly made of wood and $d$ is the skein. The axle and skein can be made of one piece of metal as is often done. The skein $d$ fits over the axle $k$ and is held in place by the lag screw $g$ and at its inner end it is provided with a shoulder or flange $d'$. The skein is also made with the portions corresponding to the cylindrical end portions of the boxing and are preferably of different diameters, the outer portion or that nearest the end of the axle being of the smaller diameter, and the middle portion being tapered as in an ordinary skein.

$e$ and $f$ are anti-friction rollers placed between the boxing and the skein and located in the cylindrical end portions.

$c$ is a nut having a flange or enlarged part for the purpose of holding the wheel in place, and also keeping the anti-friction rollers $e$ in place. The rollers $f$ are held in place by the stepped portion of the boxing and the flange $d'$ of the skein. The nut $c$ screws onto the end of the skein or axle as in an ordinary axle.

The anti-friction rollers $e$ and $f$ are made preferably cylindrical in shape, and about one-third the length of the bearing surface on an ordinary carriage or wagon skein. They are made in two sets, one set being placed at each end of and surrounding the skein, leaving a space between the two sets of rollers longitudinally about equal to the length of a roller. Tapered rollers might be used, and the boxing and the axle made to conform to the same, but I prefer the form specified. The anti-friction rollers may be spaced or kept apart in this bearing by any known devices for spacing. I do not wish to confine myself to the form shown.

I claim as my invention—

1. The combination with an axle having a tapering middle portion, and cylindrical portions contiguous to and bordering upon the ends of the tapering portion, the outer cylindrical part being of smaller diameter than the inner cylindrical part, an annular shoulder at the inner end of the inner cylindrical part, and a threaded extension at the outer end of the axle, of a boxing composed of two parts which are connected together by a screw thread joint, one part having a tapering section to snugly fit upon the tapering portion of the axle and a cylindrical section to encircle the cylindrical part thereof, and the other part being cylindrical and embracing the corresponding cylindrical portion of the axle, rollers interposed between the cylindrical parts of the box and axle, and a flanged nut to retain the box in place, substantially as described.

2. The herein described bearing for vehicle wheels, composed of an axle having its outer end reduced and threaded and an annular shoulder at the inner end of the spindle, the inner and outer end portions of the spindle being cylindrical and of different diameters, and the intermediate portion tapering, a box held between the inner shoulder and a flanged nut on the threaded end and composed of two parts which are connected by screw thread joints, the end portions being cylindrical and enveloping the cylindrical parts of the spindle, and the intermediate part tapering to conform to and snugly fitted upon the tapering part of the said spindle, and rollers fitted in the spaces between the cylindrical parts of the axle spindle and the boxing and confined between the ends of the tapering part of the boxing and the annular shoulder and flanged nut, respectively, substantially as described.

In testimony whereof I affix my signature in presence of two witnesses.

ROBERT WILSON.

Witnesses:
W. MÜLLER,
G. BEINECKE.